INVENTOR
HANS MULCH
BY Krafft & Wells
ATTORNEYS

Sept. 2, 1969  H. MULCH  3,464,767
AUTOMATIC SLIDE PROJECTOR WITH BUILT IN TIMER
AND AUTOMATIC MAGAZINE RETURNING MECHANISM
Filed March 20, 1967  3 Sheets-Sheet 3
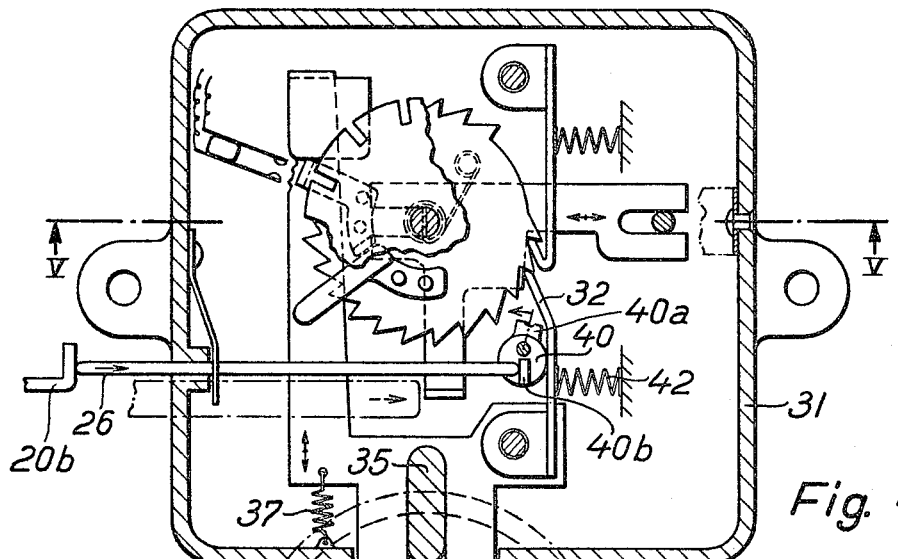
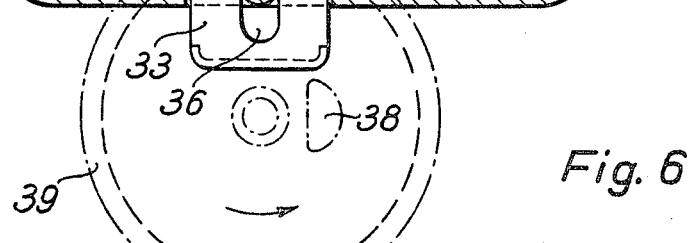
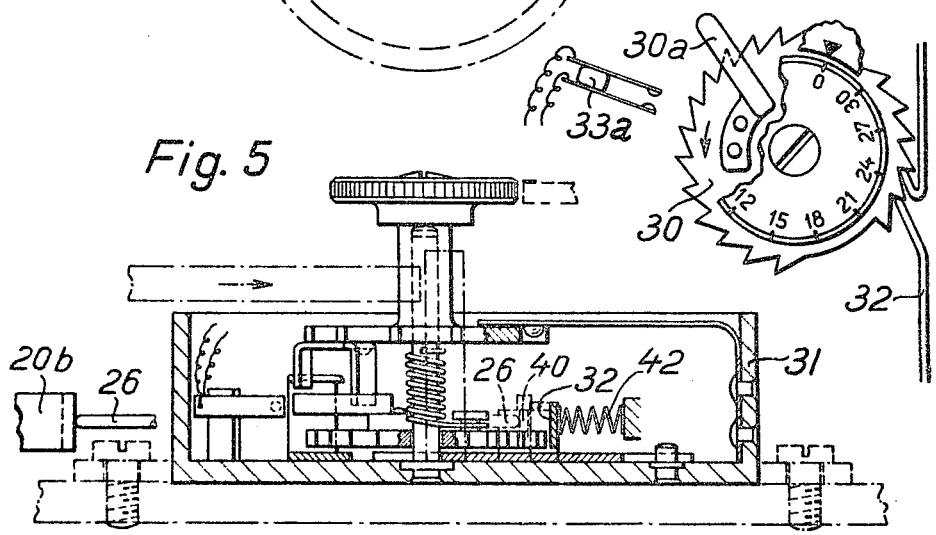
INVENTOR
HANS MULCH
BY
Krafft & Wells
ATTORNEYS

United States Patent Office 3,464,767
Patented Sept. 2, 1969

3,464,767
AUTOMATIC SLIDE PROJECTOR WITH BUILT IN TIMER AND AUTOMATIC MAGAZINE RETURNING MECHANISM
Hans Mulch, Wetzlar, Germany, assignor to Ernst Leitz GmbH, Optische Werke, Wetzlar, Germany
Filed Mar. 20, 1967, Ser. No. 624,415
Claims priority, application Germany, Mar. 30, 1966, L 41,825
Int. Cl. G03b 21/00; G09f 11/30
U.S. Cl. 353—116                    6 Claims

ABSTRACT OF THE DISCLOSURE

A slide projector for automatically changing the exhibited slides is provided having a timer for controlling the projection time of the slides. The slide magazine is automatically returned to its starting position immediately following the retransfer of the last slide into the magazine. In order to render the timer and consequently the automatic changing mechanism ineffective during the period of magazine return, a gear and lever mechanism is incorporated into the projector.

CROSS-REFERENCE TO RELATED APPLICATIONS

Application No. L 41,825/42h Gbm has been filed Mar. 30, 1966 in the Patent Office of the Federal Republic of Germany. Reference is further made to U.S. Patent 3,192,657 issued to applicant on July 6, 1965 and to U.S. Patent 3,220,306 issued on Nov. 30, 1965 to F. Papke, Germany.

BACKGROUND OF THE INVENTION

Field of the invention

My present invention pertains to slide projectors of the type in which a reciprocable lever transfers the slides from a magazine compartment into viewing position and back into the magazine. More specifically the invention pertains to projectors of this nature in which the transferring actions of the lever are controlled by a timer which may be set to various time intervals. A mechanism for returning the magazine to its starting position after the last slide has been retransferred from the viewing position to the magazine compartment is also built into the projector, thereby rendering the projector particularly useful for advertising purposes, e.g. in store window displays.

Description of the prior art

It is well known in the art to provide the magazines of the above mentioned projector type with suitable cams at the front and rear end of the magazine such as rigid plates inserted into the first and last slide compartment of the magazine. The plates serve as abutting members for engaging electric switches by means of which the action of the magazine returning mechanism is controlled.

It is, however, a disadvantage of the presently known devices that the time needed for magazine return is to be subtracted from the viewing time of the first slide in the magazine. To understand this in more detail it should be realized that the timer sends an impulse for slide change at the end of the viewing time. The reciprocable lever then transfers the slide back into its magazine compartment, waits in this outward position for a period of time long enough for the magazine to be advanced by the width of one compartment and then transfers the next slide into projecting position. Thus, after the last slide is transferred back into its compartment, the magazine will be transported in a forward direction as usual. Immediately after the beginning of this forward motion, however, the plate inserted into the last magazine compartment will abut against the electric switch, thus closing the electric circuit of the magazine return mechanism. The magazine will then be transported back to its starting position in a quick action, at the end of which the plate inserted into the front slide compartment actuates a second switch. Actuation of said switch will render the magazine returning mechanism ineffective, the magazine will be stopped in its return motion with the first slide in alignment with the reciprocable lever and ready to be transferred into the viewing position.

During the period of magazine return a special mechanism to be described in more detail hereinafter prevents the reciprocable lever from moving from its outward position into the slide projection position. The lever is rather kept in its outward position which more clearly could be termed "waiting position," until the magazine return has come to an end. Only then said lever is set free to continue its cycle and transfer the first slide into the path of light rays.

Since, however, the timer is in no way, neither mechanically nor electrically, related to the act of magazine return, the timer "counts" the interval allowed for projection of a single slide as usual. These intervals, as is important to understand, extend from the end of the viewing time of one slide to the end of the viewing time of the next slide, at which moments the timer sends its impulses. The action of the reciprocable lever therefore comprises in one cycle in the proper order the single acts of transferring the previous slide back into its magazine compartment, of waiting for the magazine to be advanced by one compartment, of transferring the next slide into the viewing position and of waiting in this inward position for the next impulse to be sent. The latter fraction of the complete interval at the same time being the actual viewing time.

It will therefore be readily understood that if the reciprocal lever is kept in its outward "waiting" position until the magazine return is completed, this waiting time has to be deducted from the viewing time. If, by way of example, the timer is set to send impulses every 30 sec. and if the acts of transferring the previous slide back into the magazine, of waiting for the magazine to be advanced, and of introducing the next slide require a total of 2 sec. the actual viewing time will then be the remaining 28 sec. Now, if the lever is kept in its "outward" position for an additional 10 sec. to wait for the completing of the back transport of the magazine, then the actual viewing time will only be 18 sec.

Thus another more serious disadvantage becomes easily discernible. If the timer should be set to a shorter time than is required by the magazine to travel back from its end position to its starting position, the first slide will be transferred back into its compartment immediately after it had been introduced into the path of light rays because its viewing time is already up. This would even be the lesser disadvantage, still more serious would it be if the reciprocable lever would be caused by the next sent impulse to move back into the viewing position at a time at which the magazine has not yet fully returned to its starting position and would thus interfere with the still back travelling magazine.

SUMMARY OF THE INVENTION

It is therefore an object of my invention to overcome the outlined disadvantages by providing in a projector of the above characterized type for a mechanical interconnection between the gear train that serves to transport the magazine from its end position back to its starting on the one hand and the timer on the other hand. It is a particular object of my invention to secure inoperativeness of the timer whenever the gear train for the magazine return is in action and vice versa.

To this end a pivotable one-armed lever is provided in the projector. The lever is capable of alternately resting in two opposite positions and is pivoted from one position to the other in dependence on the position of the slide magazine. The lever has two working portions one of which is adapted to engage the gear train for the magazine return whenever the lever rests in one position. In this gear train said lever arm disengages a clutch which otherwise connects the gear train to the propelling motor. Consequently, the gear train will be inoperative when engaged by said arm.

The other portion of the two lever working portions is adapted to engage the timer whenever the lever rests in its other position. The timer is provided with a slidable rod extending outwardly of its casing and being interconnected to the actual timing mechanism. The timing mechanism is prevented from operation and thus from sending impulses if the rod is depressed into the casing by the other lever portion.

The free end of the one-armed lever extends near the magazine which is provided with two cams as herein mentioned before. One cam being arranged at the front end and the other one at the rear end of the magazine. The rear cam abuts against the lever upon magazine advance after return of the last slide into its compartment. As a result the lever is pivoted to rest in the one of its two positions in which the last mentioned working portion acts upon the slidable rod extending from the timer. The rod is depressed to stop any operation of the timer.

At the same time the first mentioned working portion of the lever is disengaged from the gear train for the magazine return, thus allowing the clutch to couple said gear train to the motor. The magazine will then be returned to its starting position in which the front magazine cam will abut against the lever and will pivot it back to its other position. As a result the first mentioned working portion of the lever again interengages the gear train for the magazine return, decoupling the clutch that connects the gear train to the propelling motor. The last mentioned working portion of the lever, however, will at the same time release the slidable rod, consequently allowing the timer to continue to send its impulses.

BRIEF DESCRIPTION OF THE DRAWINGS

The invention can best be explained by reference to the accompanying drawings, wherein:

FIGURE 4 is a side view of the timer with one side of the casing removed;

FIGURE 5 is a cross-section of FIGURE 4 along the lines V—V;

FIGURE 6 shows the ratchet wheel of the timer in detail;

DESCRIPTION OF THE PREFERRED EMBODIMENT

Figure 1:
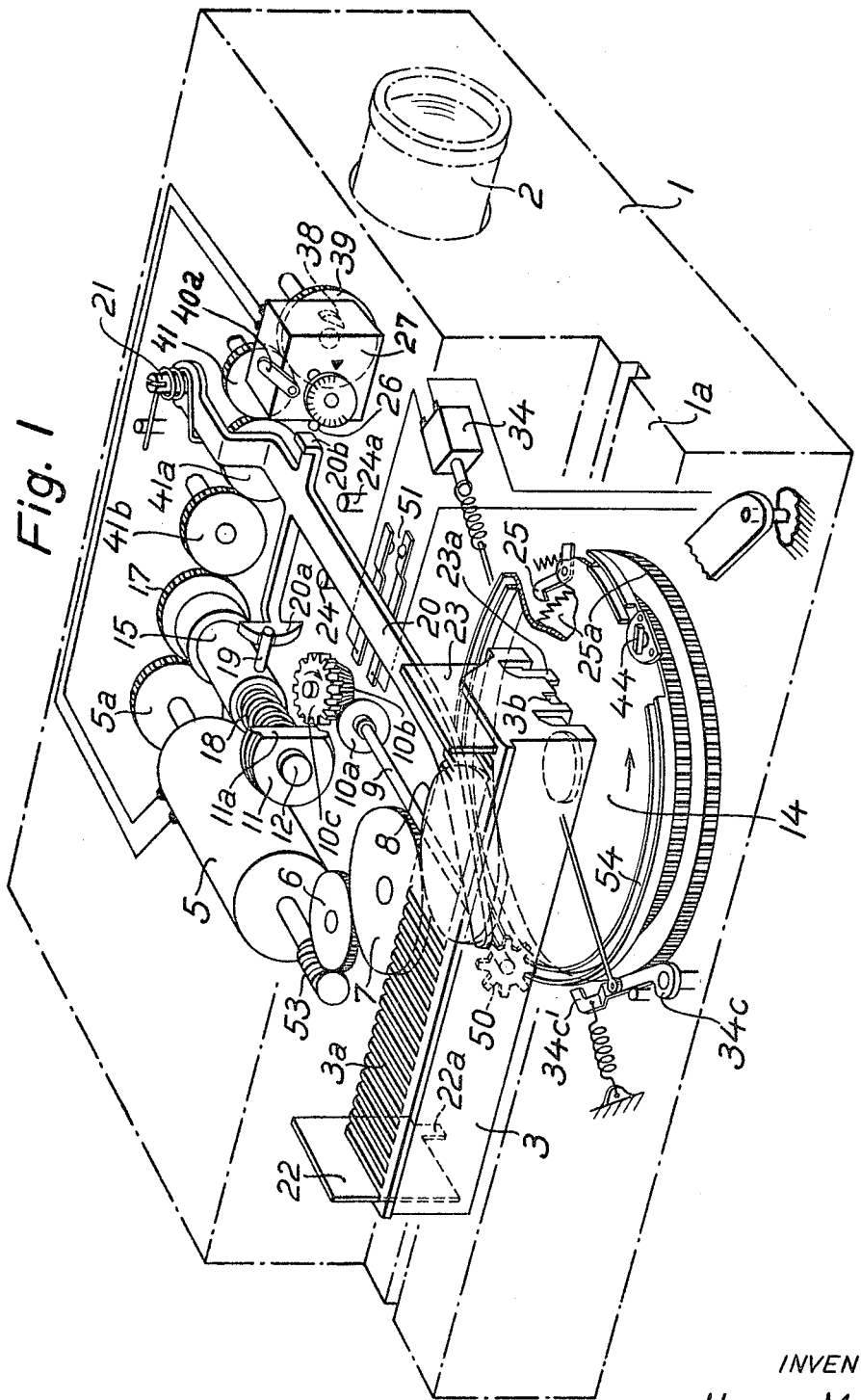
FIGURE 1 is a schematic perspective view of the projector with parts non-essential for the comprehension of the invention deleted.

In FIGURE 1 a slide projector is illustrated comprising the casing 1 and having a projection lens 2. Other optical elements of the projector such as the lamp bulb, the condensor and the like are not shown for sake of simplicity. They may, however, be assumed to be of the same general nature as disclosed in the U.S. Patent 3,220,-306 issued on Nov. 30, 1965 to F. Papke, Germany.

A slide magazine 3 is positioned on a platform 1a conventionally arranged alongside the casing 1 and being an integral part thereof. The magazine 3 is provided with compartments 3a for the slides to be inserted therein. A rack gear 3b is part of the magazine 3 extending from the front end to the rear end on the magazine's lower side. The rotatable gear 50 is part of the projector and is in mesh with rack gear 3b. In the time interval between the projection of consecutive slides gear 50 serves to advance magazine 3 by one gear tooth which is equal to the width of one slide compartment.

The elements of the projector which transfer the slides from the magazine to their viewing position and back to the magazine, as well as the elements which cause the gear 50 to rotate by one gear tooth after each backtransfer of a slide are omitted in the drawings and in the specification for sake of simplicity. They are disclosed, however, in the U.S. Patent 3,192,657 issued to me on July 6, 1965 and it is to be understood, that these elements in my present invention are identical to those in the mentioned patent.

This is particularly true of gear 50 which in said patent is also designated 50. It is actuated by the rotatably mounted crank disc 14 by means of the gear actuating means 44 and the grooved track 54 upon rotation of disc 14. The latter is propelled by the electric motor 5 via the intermediate gears 6, 7, 8.

According to my present invention gear 50 is mounted on shaft 9 on the other end of which a bevel gear 10a is fixed. By way of a second bevel gear 10b and the spur gear 10c, which is mounted coaxially and is rigidly connected to bevel gear 10b gear 10a is in driving engagement with gear 11. The latter being coupled to the motor 5 by means of a clutch to be described hereinafter. It is to be noticed, however, that gear 11 does not have gear teeth all way round its circumference. It rather is provided with a plane section 11a. Gear 10c may thus rotate freely whenever it is faced by section 11a.

Figure 3:
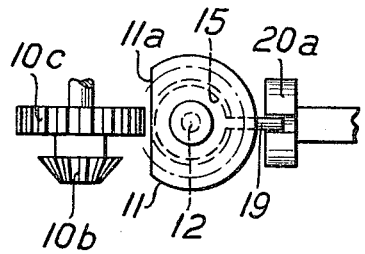
FIGURE 3 shows a detail of the clutch.
Figure 2:
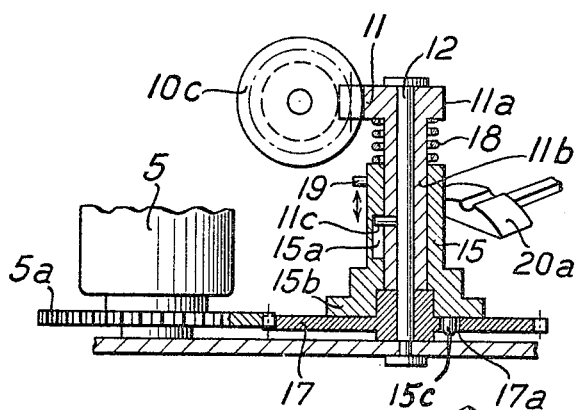
FIGURE 2 is a schematic side elevational view of the clutch connecting the gear train for magazine return to the projector.

The elements and function of the above mentioned clutch will be more easily explained with reference to FIGURES 2 and 3. There, gear 10c is shown in mesh with gear 11. The latter being an integral part of the hollow shaft 11b which is journalled on the stationary shaft 12.

A hollow shaft 15 is journalled on the hollow shaft 11b. A groove 15a extends on the inside of the hollow shaft 15 in the direction of the axis.

A pin 11c projects radially from the hollow shaft 11b and engages the groove 15a, thus constituting a driving connection between the hollow shafts 11b and 15.

At its lower end the hollow shaft 15 is formed into a disc 15c which is positioned to face the flat side of a gear 17. A hole 17a is provided in said flat side adapted to be engaged by a pin 15c mounted on disc 15b. A spring 18 keeps pin 15c positioned in hole 17a. Gear 17 is in mesh with gear 5a which is rigidly mounted on the motor shaft.

Extending radially from the hollow shaft 15 is a pin 19. As will hereinafter be described in more detail pin 19 is to be engaged by the working portion 20a of a one armed lever 20 and is to be lifted by said portion against the force exerted by the spring 18. As a result pin 15c will become disengaged from hole 17a and consequently gear 11 will become decoupled from the propelling force of the motor 5.

The aforementioned one-armed lever 20 is pivotably mounted on the casing 1 by means of the screw 21 (FIG. 1) and extends under the magazine 3 adjacent to the gear 50. It is emphasized, however, that lever 20 should be regarded as an example only. Any technical element being capable of assuming two opposite positions such as sliding elements and the like could accomplish the functions of this lever. The lever 20 is pivotable by the two cam plates 22 and 23 inserted one into the front slide compartment and the other one into the rear slide compartment of magazine 3. The cam plates are provided with cams 22a and 23a adapted to abut against the front end of lever 20. The latter will thereby be pivoted from one resting position to a second resting position between two rest pins 24 and 24a.

Two working portions 20a and 20b are integral parts of lever 20. Portion 20a is designed to engage pin 19 projecting from the hollow shaft 15, whereas portion 20b is designed to actuate a slidable rod 26 projecting from the timer 27. With particular reference to FIGURE 1 it will readily be realized that the lever 20 is capable only of either engaging pin 19 or of actuating rod 26 depending on which of its two positions the lever rests in.

The timer 27 is adapted to automatically send impulses for actuation of the slide changing mechanism in preselected time intervals. It is to be understood, however, that the timer as such is not claimed to be part of my present invention. It will therefore be described only to an extent necessary for the comprehension of the actions of lever 20.

Incorporated in the timer is a ratchet wheel 30 which carries a switch nose 30a (FIG. 4). For advancing the ratchet wheel 30 a resilient pawl 32 is provided which is mounted on a slide member 33. Any time the ratchet wheel 30 is rotated sufficiently for the nose 30a to abut against the contact 33, The latter sends an impulse thereby initiating the slide change. The ratchet wheel 30 is then returned to its starting position by means depicted in the FIGURES 4–6 but not particularly described, since they are of no importance with regard to my present invention. In the same way the means for setting the timer to various time intervals are shown in the drawings but for sake of simplicity are not explained.

The elements important in respect to this invention are the ratchet advancing pawl 32 and the slide member 33 on which it is mounted. The latter projects through an opening in the timer casing 31 and is inside the casing mounted on the rail 35 by means of the slot 36. Slot 36 is long enough to allow for a certain to and fro motion of slide member 33 which is subject to the action of a tension spring 37 that tends to keep the slide member in its outward position. The outward projection of said slide member is acted upon by a cam 38 provided on the gear 39. The latter by way of the intermediate gears 41, 41a and 41b being in constant mesh with gear 17 and thereby with gear 5a mounted on the motor shaft. Gear 39 with its cam 38 will thus rotate continuously whenever the projector is put into operation.

To put the timer out of operation whenever no automatic slide change is required an eccentric bolt 40 is pivotably arranged adjacent the pawl 32. A lever arm 40a is fixed to the bolt 40. The latter may be switched from outside of the projector casing 1 by the operator of the projector.

As illustrated in FIGURE 4, the bolt may assume a position that allows the pawl 32 to engage the teeth of ratchet wheel 30. The lever 40a may, however, be switched in the direction of the arrow (FIG. 4) thereby pivoting bolt 40 into a position in which it prevents pawl 32 to engage the ratchet wheel teeth. The timer will then be out of operation although the slide member 33 together with pawl 32 will continue their to and fro motion.

However, the bolt 40 may be switched into the position in which it acts upon the pawl 32 not only by means of lever 40a, but also by means of rod 26. To this end the bolt 40 is provided with an abutment 40b with which one end of rod 26 is in abutting contact. As hereinbefore described the other end of rod 26 is acted upon by lever portion 20b of lever 20. Again it should be realized that bolt 40 and rod 26 are incorporated only by way of example. Any mechanical element that prevents engagement of pawl 32 with the toothed ratchet wheel in one of its positions and allows said engagement while assuming another position could serve the same purpose.

Disregarding the conventional operation of the projector as far as the slide change is concerned the elements constituting my invention function as follows:

During the course of projection of one slide after the other lever 20 is kept in its left hand position as illustrated in FIGURE 1 in which it abuts against rest pin 24. As can also be seen from FIGURE 1 in this position lever portion 20a engages pin 19 and thereby keeps the hollow shaft 15 in its upper position against the force exerted on shaft 15 by spring 18. Consequently the pin 15c is kept out of hole 17a thus decoupling shaft 15, shaft 11c and gear 11 from the propelling force of motor 5. It is particularly called to attention that the relative position of pin 19 to the plane section 11a of gear 11 is such that section 11a faces gear 10c whenever lever portion 20a keeps gear 11 decoupled from gear 17 as can be seen from FIGURES 2 and 3.

During the period of time just described, rod 26 is disengaged from lever portion 20b, thereby allowing the timer to operate normally and to send its impulses in the preselected intervals. During this period, gear 50 also transports the magazine 3 in a conventional way under the propulsion of crank disc 14 and particularly by the gear actuating means 44 as can be seen in more detail from my previously mentioned U.S. Patent 3,192,657.

The gear actuating means 44 remain in a position opposite to gear 50 as shown in FIGURE 1 whenever the reciprocable lever is in its "inward" position, i.e. whenever a slide is in viewing position.

At the end of the viewing time of the last slide the timer will send its usual impulse for slide changing. Thereupon crank disc 14 will start to rotate in the direction of the arrow. After a rotation through 180° during which period the slide will be retransferred to its magazine compartment, the gear actuating means will engage gear 50 and cause it to rotate in a clockwise direction (FIG. 1) by one gear tooth thereby advancing the magazine by the width of one compartment.

Thereupon the rear cam plate 22 abuts with its cams against the front portion of lever 20 thereby shifting the lever into its other resting position where it is in abutment with rest pin 24a. This action of shifting lever 20 has a threefold effect:

(a) An electrical circuit breaker 51 is closed and kept actuated during magazine return thereby energizing the solenoid 34 (also designated 34 in U.S. Patent 3,192,657). As a result of the energization of solenoid 34 the locking lever 34c will be pivoted by means of connection rod 34b. The detent 34c' will thus be brought in the path of the pawl 25 which together with the saw-tooth shaped gear teeth of disc 25a constitutes the clutch that couples the crank disc 14 to the motor 5. Disc 25a rotates constantly, whereas crank disc 14 is coupled to the disc 25a only for the period of the slide change as is more fully and in detail described in the above mentioned patent.

At the end of a 180° revolution pawl 25 will abut against the detent 34c' and will thereby be withdrawn from the gear teeth of disc 25a consequently stopping crank disc 14 immediately after the gear actuating means 44 has passed by the gear 50. The latter is left standing above a section of crank disc 14 adjacent the gear actuating means 44 where the crank disc 14 is not provided with the grooved track 54. Thus the gear 50 is rendered free to rotate without any interference by the grooved track.

Figure 7:
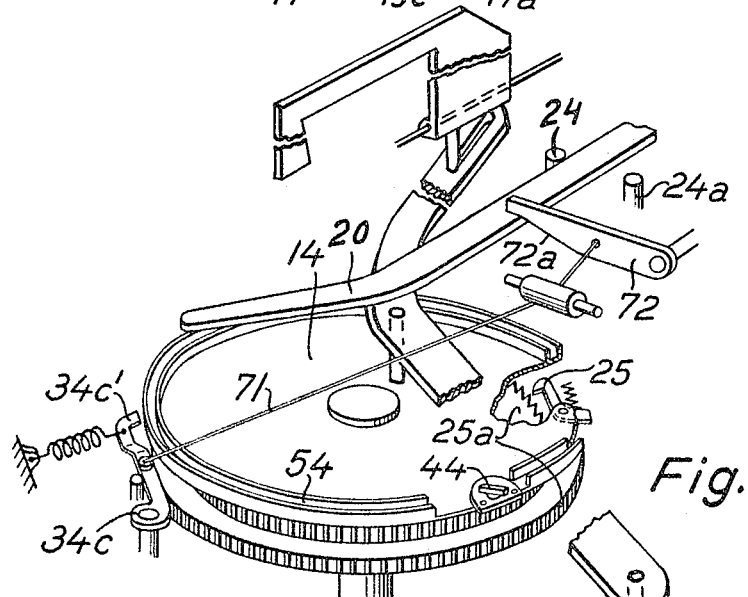
FIGURE 7 is a partial schematic view of the projector such as FIGURE 1 illustrating different clutch release means for decoupling the slide changing mechanism from the driving motor during magazine return.

It is, however, particularly pointed out, that the clutch release means, i.e. stopping lever 34c, may also be pivoted mechanically as shown in FIGURE 7. In this embodiment a wire-string 71 is connected to the stopping lever 34c. A pivotable lever 72 is provided to which the other end of string 71 is fastened. Lever 72 has an oblique edge 72a in abutting contact with lever 20. Shifting lever 20 will pivot lever 72 in a clockwise direction, thus purely mechanically bringing detent 34c' of stopping lever 34 into the path of pawl 25 with exactly the same consequences as described before.

(b) Pin 19 is released by and from lever portion 20a. As a result spring 18 advances the hollow shaft downwards as shown in FIGURE 2 and consequently pin 15c will lock into hole 17a of gear 17. Since the latter as hereinbefore described is constantly rotated by gear 5a of motor 5, the hollow shaft 15 and therewith gear 11 will also be rotated in the direction of the arrow in FIGURE 1. The latter will then come in mesh with gear 10c which will also be caused to rotate. Gear 11 is provided with a helical gearing and the gearing ratio between gear 11 and gear 10c is such that one complete revolution of gear 11 advances gear 10c by one gear tooth. The rotation of gear 10c will be transmitted to gear 50 by way of the bevel gears 10a, 10b and shaft 9. Consequently gear 50 will rotate in the same direction and will thereby return the magazine 3 in its starting position.

(c) Lever portion 20b will actuate rod 26. As a result rod 26 will slide in the direction of the arrow as illustrated in FIGURE 4. The eccentric bolt 40 will be pivoted in an anti-clockwise direction thereby abutting against pawl 32. The latter will lean to the right hand side as of FIGURE 4 and thus will become disengaged from the teeth of ratchet wheel 30. The timer is thus rendered inoperative even though the slide member 33 with pawl 32 mounted thereon will continue its to and fro motion as caused by gear 39 and cam 38. It is thereby assured that during magazine return no impulses for slide change are sent by the timer, this being one of the main objects of my invention.

After the magazine 3 has been returned into its starting position the lever 20 will be shifted back into its left hand resting position as of FIGURE 1 where it abuts against rest pin 24. This is accomplished by the front cam plate 23 inserted into the first slide compartment of the magazine.

Shifting back of lever 20 reestablishes the operation conditions inside of the projector as they existed before the lever was shifted to its right hand position to the effect that:

(a) Lever portion 20b stops to actuate rod 26. The eccentric bolt 40 will be released and as a result thereof spring 42 will force pawl 32 to re-engage the teeth of ratchet wheel 30.

(b) Lever portion 20a will again extend into the range of pin 19. During the following revolution, the latter will slide upward an oblique plane provided at the end of portion 20a which can best be seen from FIGURE 2. Pin 19 will thus be lifted against the force of spring 18 thereby withdrawing pin 15c from hole 17a as a result of which gear 11 will become decoupled from motor 5. Owing to the previously pointed out position of pin 19 relative to the plane section 11a of gear 11 this section 11a will face gear 10c at the moment of arrest of pin 19 by lever portion 20a. Gear 10c, shaft 9 and therewith gear 50 are thus again free to rotate under the propulsion of the gear actuating means 44 on crank disc 14.

Circuit breaker 51 is opened which causes the solenoid 34 to be deenergized. Locking lever 34c with its detent 34c' is then removed from the path of pawl 25. As a result thereof crank disc 14 will be rotated through the remaining 180° during which period the reciprocable lever transports the first slide into viewing position. After that, conventional transport of slides and magazine will be resumed and continued until all slides in the magazine have been projected. Abutment of the rear cam plate 22 against lever 20 will then again initiate magazine return in the above described manner.

It will be understood that this invention is susceptible to modification in order to adapt it to different usages and conditions and, accordingly, it is desired to comprehend such modifications within this invention as may fall within the scope of the appended claims.

What I claim is:

1. A slide projector having a magazine (3) subdivided into compartments (3a) for storing a plurality of slides, one in each compartment, a reciprocable means adapted to transfer a single slide at a time from the magazine compartment (3a) into viewing position and back into the slide compartment (3a), means (50) for advancing said magazine (3) by the width of one compartment (3a) after each retransfer of a slide, an electric motor (5) adapted to operate said reciprocable means and said magazine advancing means (50) automatically upon an electric impulse, a first clutch for operatively connecting said motor (5) to said reciprocable means and said magazine advancing means (50), an adjustable timer (27) adapted to send said impulses at preselected intervals, means (9, 10a, 10b, 10c, 11) for returning said magazine (3) to its starting position following the retransfer of the last slide into its compartment, the improvement comprising a mechanical means (20) being positionable in two different resting positions, cams on said magazine being adapted to engage said mechanical means (20) in the starting position and in the end position of said magazine (3), two working portions (20a, 20b) being an integral part of said mechanical means (20), stopping means (40) being provided at said timer (27) for rendering said timer (27) inoperative upon actuation of said stopping means (40), means (26) for actuating said stopping means (40) and being adapted to be engaged by the second one of said working portions (20b), a second clutch being provided for connecting said magazine return means (9, 10a, 10b, 10c, 11) to said electric motor, said clutch being adapted to be released upon being engaged by said first working portion (20a), and means for decoupling said first clutch in dependence on the position of said mechanical means (20).

2. A slide projector according to claim 1, said mechanical means (20) being a pivotable lever.

3. A slide projector according to claim 1 with cam plates (22, 23) inserted into the front and the rear magazine compartment (3a), said cam plates (22, 23) having cams (22a, 23) adapted to engage said mechanical means (20) in the starting and the end position of said magazine (3).

4. A slide projector according to claim 1, said second clutch comprising a helical gear (11) having a plane section (11a) on its circumference, an axially displaceable hollow shaft (15) in driving connection with said helical gear (11), a pin (15c) projecting axially from said hollow shaft (15) for engaging a constantly rotating gear (17), a second pin (19) projecting radially from said hollow shaft (15) adapted to engage said first working portion (20a) of said mechanical means (20), said plane section (11a) being positioned relative to said second pin (19) so as to face the gear (10c) meshing with said helical gear (11) when said second pin (19) is engaged by said first working portion (20a).

5. A slide projector according to claim 1, said first clutch being operable by a solenoid, said clutch release means being an electric circuit breaker in the circuit of said solenoid and being positioned to be engaged by said mechanical means (20).

6. A slide projector according to claim 1, said first clutch being mechanically operable, a lever (72) being provided for releasing said first clutch, said lever being positioned to be engaged by said mechanical means and being in operative connection with said first clutch.

References Cited

UNITED STATES PATENTS

| 2,969,711 | 1/1961 | Robinson et al. | 353—116 XR |
|---|---|---|---|
| 3,015,251 | 1/1962 | Pollan | 353—116 |
| 3,029,693 | 4/1962 | Brumley et al. | 353—116 |

NORTON ANSHER, Primary Examiner

R. P. GREINER, Assistant Examiner

U.S. Cl. X.R.

40—79